United States Patent
Chen et al.

(10) Patent No.: US 12,432,132 B2
(45) Date of Patent: Sep. 30, 2025

(54) ADVERTISEMENT INFORMATION PROCESSING METHOD AND APPARATUS, AND STORAGE MEDIUM

(71) Applicant: Huawei Technologies Co., Ltd., Shenzhen (CN)

(72) Inventors: Peipei Chen, Beijing (CN); Guoqi Xu, Beijing (CN); Enjian Xu, Beijing (CN); Zhikun Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/993,551

(22) Filed: Nov. 23, 2022

(65) Prior Publication Data

US 2023/0092549 A1 Mar. 23, 2023

Related U.S. Application Data

(63) Continuation of application No. PCT/CN2020/141438, filed on Dec. 30, 2020.

(30) Foreign Application Priority Data

May 26, 2020 (CN) .......................... 202010453838.1

(51) Int. Cl.
*H04L 45/02* (2022.01)
*H04L 45/00* (2022.01)
(Continued)

(52) U.S. Cl.
CPC .............. *H04L 45/02* (2013.01); *H04L 45/50* (2013.01); *H04L 45/566* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 8,611,359 B1* | 12/2013 | Kompella | H04L 45/04 370/401 |
| 2020/0008067 A1* | 1/2020 | Filsfils | H04L 47/825 |

(Continued)

OTHER PUBLICATIONS

P. Psenak et al.:"IGP Flexible Algorithm" Oct. 3, 2020, total 67 pages.

*Primary Examiner* — Xavier S Wong
(74) *Attorney, Agent, or Firm* — Slater Matsil, LLP (57) ABSTRACT

This application discloses an advertisement information processing method. The method includes a first node receives, in a first IGP process, first advertisement information that is sent by a second node and that includes a destination address of the second node and a first identifier indicating, in the first IGP process, a first flexible algorithm. The first node determines whether the first identifier indicates, in a second IGP process, a flexible algorithm the same as the first flexible algorithm. When the first identifier does not indicate, in the second IGP process, the flexible algorithm the same as the first flexible algorithm, the first node advertises, in the second IGP process, second advertisement information that includes the destination address and a second identifier indicating, in the second IGP process, a second flexible algorithm, or skips advertising third advertisement information that includes the destination address. In the method, the first flexible algorithm in the first IGP process is mapped to the second flexible algorithm in the second IGP process, to resolve a problem that advertisement information imported across processes cannot work normally when flexible algorithms deployed in different IGP processes are different.

20 Claims, 4 Drawing Sheets

(51) Int. Cl.
 *H04L 45/50* (2022.01)
 *H04L 45/741* (2022.01)

(56) References Cited

U.S. PATENT DOCUMENTS

2020/0145319 A1 5/2020 Joseph et al.
2020/0344151 A1* 10/2020 Joseph .................. H04L 45/741
2022/0006721 A1* 1/2022 Negi ....................... H04L 45/04
2022/0303212 A1* 9/2022 Chan ....................... H04L 45/04

* cited by examiner

ADVERTISEMENT INFORMATION PROCESSING METHOD AND APPARATUS, AND STORAGE MEDIUM

CROSS-REFERENCE TO RELATED APPLICATIONS

This application is a continuation of International Application No. PCT/CN2020/141438, filed on Dec. 30, 2020, which claims priority to Chinese Patent Application No. 202010453838.1, filed on May 26, 2020. The disclosures of the aforementioned applications are hereby incorporated by reference in their entireties.

TECHNICAL FIELD

The present disclosure relates to the field of communication technologies, and in particular, to an advertisement information processing method and apparatus, and a storage medium.

BACKGROUND

A flexible algorithm (Flex-Algo) function is an inherent component of a segment routing-traffic engineering (SR-TE) architecture. A Flex-Algo usually includes a link cost style (currently including an IGP, TE, a link delay, and the like), an algorithm priority, and a link constraint for participating in path computation during the path computation. The Flex-Algo can provide a policy, so that a shortest constraint-based path can be computed based on the IGP.

Nodes in a same IGP process are deployed with a same Flex-Algo. When a node runs different IGP processes at the same time, the node can import a Flex-Algo in an IGP process to other IGP processes. However, the imported Flex-Algo may not work normally in the other IGP processes. As a result, a forwarding path parameter does not meet an actual requirement of a customer, and network performance is reduced.

SUMMARY

Embodiments of this application provide an advertisement information processing method, to resolve a problem that advertisement information imported across processes cannot work normally when flexible algorithms deployed in different IGP processes are different.

To achieve the foregoing objective, this application provides the following technical solutions.

A first aspect of this application provides an advertisement information processing method, where the method is applied to a first node in a network, the first node runs a first interior gateway protocol IGP process and a second IGP process at the same time, the network further includes a second node and a third node, the second node runs the first IGP process, and the third node runs the second IGP process. The method includes the first node receives first advertisement information that is sent by the second node and that includes a destination address of the second node and a first identifier, where the first identifier indicates, in the first IGP process, a first flexible algorithm. The first node can obtain related information of a flexible algorithm in each IGP process run by the first node. After receiving the first advertisement information, the first node determines whether the first identifier indicates, in the second IGP process, a flexible algorithm the same as the first flexible algorithm that the first identifier indicates in the first IGP process. When the first node determines that the first identifier does not indicate, in the second IGP process, the flexible algorithm the same as the first flexible algorithm, the first node advertises, in the second IGP process, second advertisement information that includes the destination address and a second identifier to the third node. The second identifier is different from the first identifier and the second identifier indicates, in the second IGP process, a second flexible algorithm. The second flexible algorithm may be the same as the first flexible algorithm, or may be different from the first flexible algorithm. The second advertisement information is used by the third node to generate first routing information for routing to the destination address. Alternatively, the third node may advertise the second advertisement information to another node, and the another node generates, based on the second advertisement information, the first routing information for routing to the destination address. Alternatively, when the first node determines that the first identifier does not indicate, in the second IGP process, the flexible algorithm the same as the first flexible algorithm, the first node may choose not to advertise, in the second IGP process, third advertisement information that includes the destination address.

It can be known from the foregoing first aspect that in a process of importing advertisement information across processes, the first node may first determine whether a flexible algorithm identifier that is carried in the imported advertisement information indicates a same flexible algorithm in an IGP process to which the advertisement information is to be imported. If not, the first node may include an identifier of a flexible algorithm supported by the IGP process to which the advertisement information is to be imported in the advertisement information for advertising, or may alternatively choose not to advertise the advertisement information in the IGP process to which the advertisement information is to be imported. In this way, a problem that the advertisement information imported across processes cannot work normally when flexible algorithms deployed in two IGP processes are different is resolved.

With reference to the first aspect, in a first possible implementation of the first aspect, that the first identifier does not indicate, in the second IGP process, the flexible algorithm the same as the first flexible algorithm includes two cases. In a first case, the first identifier exists in the second IGP process, but a third flexible algorithm that the first identifier indicates in the second IGP process is different from the first flexible algorithm. In a second case, the first identifier does not exist in the second IGP process.

With reference to the first aspect or the first possible implementation of the first aspect, in a second possible implementation of the first aspect, before the first node advertises, in the second IGP process, the second advertisement information to the third node, the method further includes the first node determines the second flexible algorithm based on the first flexible algorithm, where the second flexible algorithm meets a preset condition. Specifically, when the first node determines that the first identifier does not indicate, in the second IGP process, the flexible algorithm the same as the first flexible algorithm, the first node may determine the first flexible algorithm in the first IGP process based on the first identifier, and then determine, in the second IGP process based on a definition of the first flexible algorithm, the second flexible algorithm that meets the preset condition.

It can be learned from the second possible implementation of the first aspect that when the flexible algorithms deployed in the two IGP processes are different, the flexible algorithm that meets the preset condition and that is in the second IGP process to which the advertisement information is to be imported may be determined based on the flexible algorithm that the imported algorithm identifier indicates in the first IGP process, to meet a customer requirement and ensure network performance while ensuring that the advertisement information imported across processes can work normally.

With reference to the second possible implementation of the first aspect, in a third possible implementation of the first aspect, the preset condition includes one or both of the following. First, a similarity between the second flexible algorithm and the first flexible algorithm meets a first threshold. Second, a priority of the second flexible algorithm meets a second threshold. That the similarity meets the first threshold includes two cases: definitions of the second flexible algorithm and the first flexible algorithm are completely the same and partially the same. For example, the first flexible algorithm includes specific definitions: a link cost style A, an algorithm priority B, and a link constraint C for participating in path computation during the path computation. A case in which definitions are the same may mean that a definition of a flexible algorithm meets that a link cost style is A, an algorithm priority is B, and a link constraint for participating in the path computation is C during the path computation. A case in which definitions are partially the same may mean that when a definition of a flexible algorithm meets that a link cost style is A and an algorithm priority is B during the path computation, it is considered that the first threshold is met. That the priority of the second flexible algorithm meets the second threshold may mean that a priority sequence is set for flexible algorithms deployed in the second IGP process, and when the first node determines that the first identifier exists in the second IGP process, but the flexible algorithm that the first identifier indicates in the second IGP process is different from the first flexible algorithm, or when the first identifier does not exist in the second IGP process, the second flexible algorithm whose priority meets the second threshold may be selected based on the preset priority sequence. The preset condition may alternatively mean that both the similarity between the second flexible algorithm and the first flexible algorithm meets the first threshold, and the priority of the second flexible algorithm meets the second threshold.

With reference to any one of the first aspect or the first to the third possible implementations of the first aspect, in a fourth possible implementation of the first aspect, after the first node receives the first advertisement information sent by the second node, the method further includes the first node generates, in the first IGP process based on the first advertisement information, second routing information for routing to the destination address; and the first node generates, in the second IGP process, the second advertisement information based on the second routing information.

With reference to any one of the first aspect or the first to the fourth possible implementations of the first aspect, in a fifth possible implementation of the first aspect, the method further includes, when the first identifier indicates, in the second IGP process, the flexible algorithm the same as the first flexible algorithm: the first node advertises, in the second IGP process, fourth advertisement information to the third node, where the fourth advertisement information includes the destination address and the first identifier, and the fourth advertisement information is used to generate third routing information for routing to the destination address.

It can be learned from the fifth possible implementation of the first aspect that in the process of importing advertisement information across processes, the first node may first determine whether the flexible algorithm identifier that is carried in the imported advertisement information indicates the same flexible algorithm in the IGP process to which advertisement information is to be imported. If so, the advertisement information may be directly imported and advertised, thereby supporting import of the advertisement information across processes in a scenario in which the flexible algorithms deployed in the two IGP processes are the same.

With reference to the fifth possible implementation of the first aspect, in a sixth possible implementation of the first aspect, after the first node receives the first advertisement information sent by the second node, the method further includes the first node generates, in the first IGP process based on the first advertisement information, fourth routing information for routing to the destination address; and the first node generates, in the second IGP process, the fourth advertisement information based on the fourth routing information.

With reference to any one of the first aspect or the first to the sixth possible implementations of the first aspect, in a seventh possible implementation of the first aspect, when the method is applied to a segment routing over IPv6 data plane SRv6 network, the first identifier is included in a location information locator type-length-value TLV field. The destination address included in the first advertisement information may refer to a locator configured by the second node. In a route advertisement phase, after configuring the locator, the second node needs to advertise locator information to another node in the first IGP process. The locator includes the first identifier of the first flexible algorithm. For example, the first identifier is 128, and the first identifier may be included in the locator TLV field.

With reference to any one of the first aspect or the first to the sixth possible implementations of the first aspect, in an eighth possible implementation of the first aspect, when the method is applied to a multi-protocol label switching MPLS network, the destination address included in the first advertisement information may refer to a prefix-SID configured by the second node. In a route advertisement phase, after configuring the prefix-SID including the first identifier of the first flexible algorithm, the second node needs to advertise prefix-SID information to another node in the first IGP process. The first identifier may be included in a prefix-SID TLV field. The second node advertises the prefix-SID information to the another node (including the first node) in the first IGP process in a form of prefix-SID TLV, and the another node may compute, based on the first flexible algorithm indicated by the first identifier carried in the first advertisement information, routing information for routing to the prefix-SID.

A second aspect of this application provides an advertisement information processing apparatus. The processing apparatus is a first node in a network. The first node runs a first interior gateway protocol IGP process and a second IGP process. The network further includes a second node and a third node, the second node runs the first IGP process, and the third node runs the second IGP process. The processing apparatus includes a receiving module, a judging module, and an advertising module. The receiving module is configured to receive first advertisement information sent by the second node, where the first advertisement information includes a destination address of the second node and a first identifier, and the first identifier indicates, in the first IGP process, a first flexible algorithm. The judging module is configured to determine whether the first identifier in the first advertisement information received by the receiving module indicates, in the second IGP process, a flexible algorithm the same as the first flexible algorithm. The advertising module is configured to, when the judging module determines that the first identifier does not indicate, in the second IGP process, the flexible algorithm the same as the first flexible algorithm, advertise, in the second IGP process, second advertisement information to the third node, where the second advertisement information includes the destination address and a second identifier, the second identifier indicates, in the second IGP process, a second flexible algorithm, and the second advertisement information is used to generate first routing information for routing to the destination address, or skip advertising third advertisement information in the second IGP process, where the third advertisement information includes the destination address.

With reference to the second aspect, in a first possible implementation of the second aspect, that the first identifier does not indicate, in the second IGP process, the flexible algorithm the same as the first flexible algorithm includes the first identifier exists in the second IGP process, where a third flexible algorithm that the first identifier indicates in the second IGP process is different from the first flexible algorithm; or the first identifier does not exist in the second IGP process.

With reference to the foregoing second aspect or the first possible implementation of the second aspect, in a second possible implementation of the second aspect, the processing apparatus further includes a determining module. The determining module is configured to, before the advertising module advertises, in the second IGP process, the second advertisement information to the third node, determine the second flexible algorithm based on the first flexible algorithm, where the second flexible algorithm meets a preset condition.

With reference to the second possible implementation of the second aspect, in a third possible implementation of the second aspect, the preset condition includes one or both of the following: a similarity between the second flexible algorithm and the first flexible algorithm meets a first threshold; and a priority of the second flexible algorithm meets a second threshold.

With reference to any one of the second aspect or the first to the third possible implementations of the second aspect, in a fourth possible implementation of the second aspect, the processing apparatus further includes a generation module. The generation module is configured to, after the receiving module receives the first advertisement information sent by the second node, generate, in the first IGP process based on the first advertisement information, second routing information for routing to the destination address; and generate, in the second IGP process, the second advertisement information based on the second routing information.

With reference to any one of the second aspect or the first to the fourth possible implementations of the second aspect, in a fifth possible implementation of the second aspect, the advertising module is further configured to, when the judging module determines that the first identifier indicates, in the second IGP process, the flexible algorithm the same as the first flexible algorithm, advertise, in the second IGP process, fourth advertisement information to the third node, where the fourth advertisement information includes the destination address and the first identifier, and the fourth advertisement information is used to generate third routing information for routing to the destination address.

With reference to the fifth possible implementation of the second aspect, in a sixth possible implementation of the second aspect, the generation module is further configured to, after the receiving module receives the first advertisement information sent by the second node, generate, in the first IGP process based on the first advertisement information, fourth routing information for routing to the destination address; and generate, in the second IGP process, the fourth advertisement information based on the fourth routing information.

With reference to any one of the second aspect or the first to the sixth possible implementations of the second aspect, in a seventh possible implementation of the second aspect, when the processing apparatus is used in a segment routing over IPv6 data plane SRv6 network, the first identifier is included in a location information locator type-length-value TLV field.

With reference to any one of the second aspect or the first to the sixth possible implementations of the second aspect, in an eighth possible implementation of the second aspect, when the processing apparatus is used in a multi-protocol label switching MPLS network, the first identifier is included in a prefix segment identifier prefix-SID type-length-value TLV field.

A third aspect of this application provides a network device. The network device includes a processor and a memory. The memory is configured to store computer-readable instructions (or referred to as a computer program), and the processor is configured to read the computer-readable instructions to implement the method provided in the first aspect and any implementation of the first aspect.

In some implementations, the network device further includes a transceiver, configured to receive and send data.

A fourth aspect of this application provides a computer storage medium. The computer storage medium may be non-volatile. The computer storage medium stores computer-readable instructions. When the computer-readable instructions are executed by a processor, the method in the first aspect or any possible implementation of the first aspect is performed.

In embodiments of the present disclosure, the advertisement information processing method is used. In the process of importing advertisement information across processes, the first node may first determine whether the flexible algorithm identifier that is carried in the imported advertisement information indicates the same flexible algorithm in the IGP process to which the advertisement information is to be imported. If not, the first node may include the identifier of the flexible algorithm supported by the IGP process to which the advertisement information is to be imported in the advertisement information for advertising, or may choose not to advertise the advertisement information in the IGP process to which the advertisement information is to be imported. In this way, the problem that the advertisement information imported across processes cannot work normally when the flexible algorithms deployed in the two IGP processes are different is resolved.

DETAILED DESCRIPTION OF ILLUSTRATIVE EMBODIMENTS

To make objectives, technical solutions, and advantages of the present disclosure clearer, the following describes embodiments of this application with reference to the accompanying drawings. It is clear that the described embodiments are merely some rather than all of embodiments of the present disclosure. A person of ordinary skill in the art may learn that, as a new application scenario emerges, the technical solutions provided in embodiments of the present disclosure are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in appropriate circumstances so that embodiments described herein can be implemented in other orders than the order illustrated or described herein. Moreover, terms "include", "have" and any variations thereof mean to cover non-exclusive inclusions, for example, a process, method, system, product, or device that includes a list of steps or modules is not necessarily limited to those clearly listed steps or modules, but may include other steps or modules that are not clearly listed or are inherent to such a process, method, system, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into the modules in this application is logical division. In actual application, there may be another division manner. For example, a plurality of modules may be combined or integrated into another system, or some features may be ignored or may not be performed. In addition, the displayed or discussed mutual couplings or direct couplings or communication connections may be implemented through some interfaces. The indirect couplings or communication connections between the modules may be implemented in electrical or other similar forms. This is not limited in this application. In addition, modules or sub-modules described as separate components may be or may not be physically separated, or may be or may not be physical modules, or may be distributed to a plurality of circuit modules. Some or all of the modules may be selected according to an actual requirement to implement the objectives of the solutions of this application.

Segment routing (SR) is a tunneling technology based on a source routing forwarding mode. Based on SR, a network path is divided into segments, and segment identifiers (SIDs) are allocated to the segments and forwarding nodes in a network. The segments and network nodes are sequentially arranged into a segment list to form a forwarding path. Based on SR, the segment list that identifies the forwarding path is encoded in a data packet header for transmission with the data packet. SR based on multi-protocol label switching (MPLS) is referred to as SR-MPLS for short. SR based on IPv6 is referred to as internet protocol version 6 segment routing (IPv6SR) or segment routing over IPv6 data plane (SRv6).

Specifically, in an SR-MPLS network, a SID is encoded into an MPLS label or an index in the MPLS label, and an SR path is encoded into an MPLS label stack in an MPLS data packet. A prefix segment is used to identify a destination address prefix in the network. The prefix segment is propagated to another node in the network based on an interior gateway protocol (IGP) and is globally visible. The prefix segment is identified by a prefix-SID. In an SRv6 network, a segment routing header (SRH) is inserted into an IPv6 packet. The SRH carries a SID list that carries an IP address of each node that needs to be included on a forwarding path. A transit node can continuously update a destination address and offset an address stack based on the SID list to implement hop-by-hop forwarding. The SID list and the segment list have a same meaning. In the SRv6 network, a SID is a 128-bit IPv6 address. The SID includes three parts: a locator, a function, and an argument. The locator is usually used for addressing (related to routing) and indicates a destination address corresponding to a node. In a route advertisement phase, the locator can be propagated to another node in the network based on the IGP protocol and is globally visible. The function indicates a function (for example, a topology or a service) related to the SID. The argument is optional and indicates a parameter for performing an operation related to the function. For related specific content of the SRv6 and the SR-MPLS, reference may also be made to related standard technical documents in a conventional technology for understanding. Details are not described herein.

Common IGP protocols include the routing information protocol (RIP), the open shortest path first (OSPF) protocol, the intermediate system to intermediate system routing protocol (IS-IS), and the like. In a conventional IGP, some parameters are used to compute a shortest path for routing a data packet. For example, in the OSPF protocol, a COST value is used to compute a shortest path. However, when the shortest path is selected for all packets, many problems may occur. Segment routing-traffic engineering (SR-TE) can include other constraints for path computation based on conventional IGP path computation, so that a packet in the network can be transmitted over a non-shortest path. A flexible algorithm (Flex-Algo) function is an inherent component of the SR-TE. The flexible algorithm can provide a policy, so that a shortest constraint-based path can be computed based on the IGP. The Internet Assigned Numbers Authority (IANA) defines type values of different IGP algorithms. Algorithms 0 to 127 are reserved for standardization by the Institute of Electrical and Electronics Engineers (IEEE). Currently, two standard algorithm identifiers are defined in the request for comments (RFC) 8402: algorithm 0 (an SPF algorithm based on an IGP link metric) and algorithm 1 (a strict SPF algorithm based on an IGP link metric). Algorithms 128 to 255 may be customized by an operator, that is, algorithms 128 to 255 are Flex-Algos, and are also referred to as SR IGP flexible algorithms. The Flex-Algo usually includes a link cost style (currently including the IGP, TE, a link delay, and the like), an algorithm priority, and a link constraint for participating in path computation during the path computation. The link constraint refers to a constraint that needs to be complied with during computation of a path to each locator or prefix-SID carrying the Flex-Algo.

The SRv6 network is used as an example. In a route advertisement phase in a Flex-Algo scenario, the SRv6 needs to be enabled on each node in the SRv6 network and locators need to be configured. Each locator may carry one Flex-Algo. After configuring the locator, the node uses the IGP protocol to advertise locator information in a form of a locator TLV to another node in the SRv6 network. When the another node needs to find a route included in the locator, the another node needs to use a Flex-Algo carried in the locator to compute a path to the route included in the locator. Locator information in an IGP process may be imported to another IGP process. However, in a current process of importing the locator information across processes, a problem that Flex-Algos deployed in two IGP processes may be different is not considered, and therefore, the locator information imported across processes cannot work in the IGP process to which the locator information is imported. As a result, a forwarding path parameter does not meet an actual requirement of a customer, and network performance is reduced. To avoid the foregoing case, embodiments of this application provide an advertisement information processing method, to resolve a cross-process import problem of locator information or a prefix-SID when Flex-Algos deployed in two IGP processes are different and ensure that when the Flex-Algos deployed in the two IGP processes are different, the locator information or prefix-SID information can still work normally after being imported across processes. This application further provides corresponding apparatuses. Descriptions are provided below separately.

Figure 1:
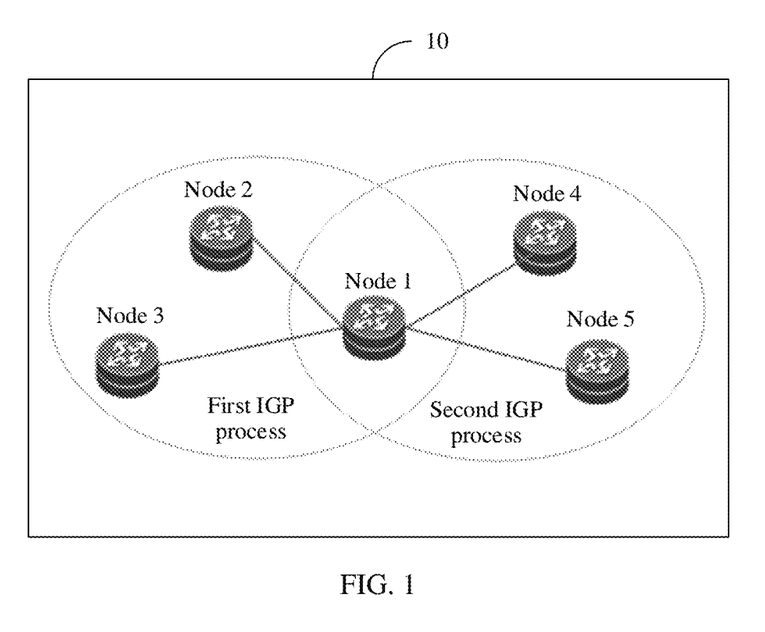
FIG. 1 is a schematic diagram of an architecture of a communication system according to an embodiment of this application.

First, a network architecture in embodiments of this application is described. FIG. 1 is a schematic diagram of a network architecture according to an embodiment of this application. A network 10 shown in FIG. 1 uses a segment routing (SR) technology, and may be an SRv6 network or an SR-MPLS network. This is not limited in this embodiment of this application.

As shown in FIG. 1, the network 10 may include a plurality of nodes, and an IGP protocol process (IGP process for short) is run on each node. The IGP process in this embodiment of this application may be a RIP process, an OSPF process, an IS-IS process, or the like. FIG. 1 shows two IGP processes. A first IGP process includes a node 1, a node 2, and a node 3. That is, the node 1, the node 2, and the node 3 run the first IGP process. A second IGP process includes the node 1, a node 4, and a node 5. That is, the node 1, the node 4, and the node 5 run the second IGP process. It should be understood that the network 10 may further include more IGP processes, each IGP process may further include more nodes, and there are different connection relationships. In a scenario shown in FIG. 1, only the two IGP processes and the node 1, the node 2, the node 3, the node 4, and the node 5 are used as examples, and this should not be construed as a limitation on this application. For example, in addition to the first IGP process and the second IGP process, the node 1 may run another IGP process. In addition to the first IGP process, the node 2 or the node 3 may run another IGP process, for example, a third IGP process. Only the first IGP process and the second IGP process that are included in the network 10 are used as an example. The first IGP process may be any one of the RTP process, the OSPF process, or the IS-IS process, and the second IGP process may also be any one of the RTP process, the OSPF process, or the IS-IS process. The first IGP process and the second IGP process may be a same IGP protocol process, or may be different IGP protocol processes. For example, the first IGP process is the IS-IS process, and the second IGP process is the OSPF process. This is not limited in this embodiment of this application.

In this embodiment of this application, one or more flexible algorithms may be deployed in both the first IGP process and the second IGP process. Each flexible algorithm corresponds to a specific algorithm ID and includes a specific definition. Quantities of flexible algorithms deployed in the first IGP process and the second IGP process may be the same or may be different. If flexible algorithms having a same algorithm ID are deployed in the first IGP process and the second IGP process, a definition of a flexible algorithm that the algorithm ID indicates in the first IGP process may be the same as or different from a definition of a flexible algorithm that the algorithm ID indicates in the second IGP process. This is not limited in this embodiment of this application. For example, three flexible algorithms whose algorithm IDs are 128, 129, and 130 are deployed in the first IGP process, and two flexible algorithms whose algorithm IDs are 128 and 136 are deployed in the second IGP process. The ID 128 indicates, in the first IGP process, a first flexible algorithm. The first flexible algorithm includes specific definitions: a link cost style A, an algorithm priority B, and a link constraint C for participating in path computation during the path computation. In the second IGP process, 128 is also deployed, and 128 also indicates, in the second IGP process, the first flexible algorithm, that is, 128 is specifically defined as a flexible algorithm of the link cost style A, the algorithm priority B, and the link constraint C for participating in the path computation during the path computation. Alternatively, 128 may indicate, in the second IGP process, a second flexible algorithm whose definition is different from that of the first flexible algorithm. The second flexible algorithm includes specific definitions: the link cost style A, an algorithm priority D, and a link constraint F for participating in the path computation during the path computation.

Figure 2:
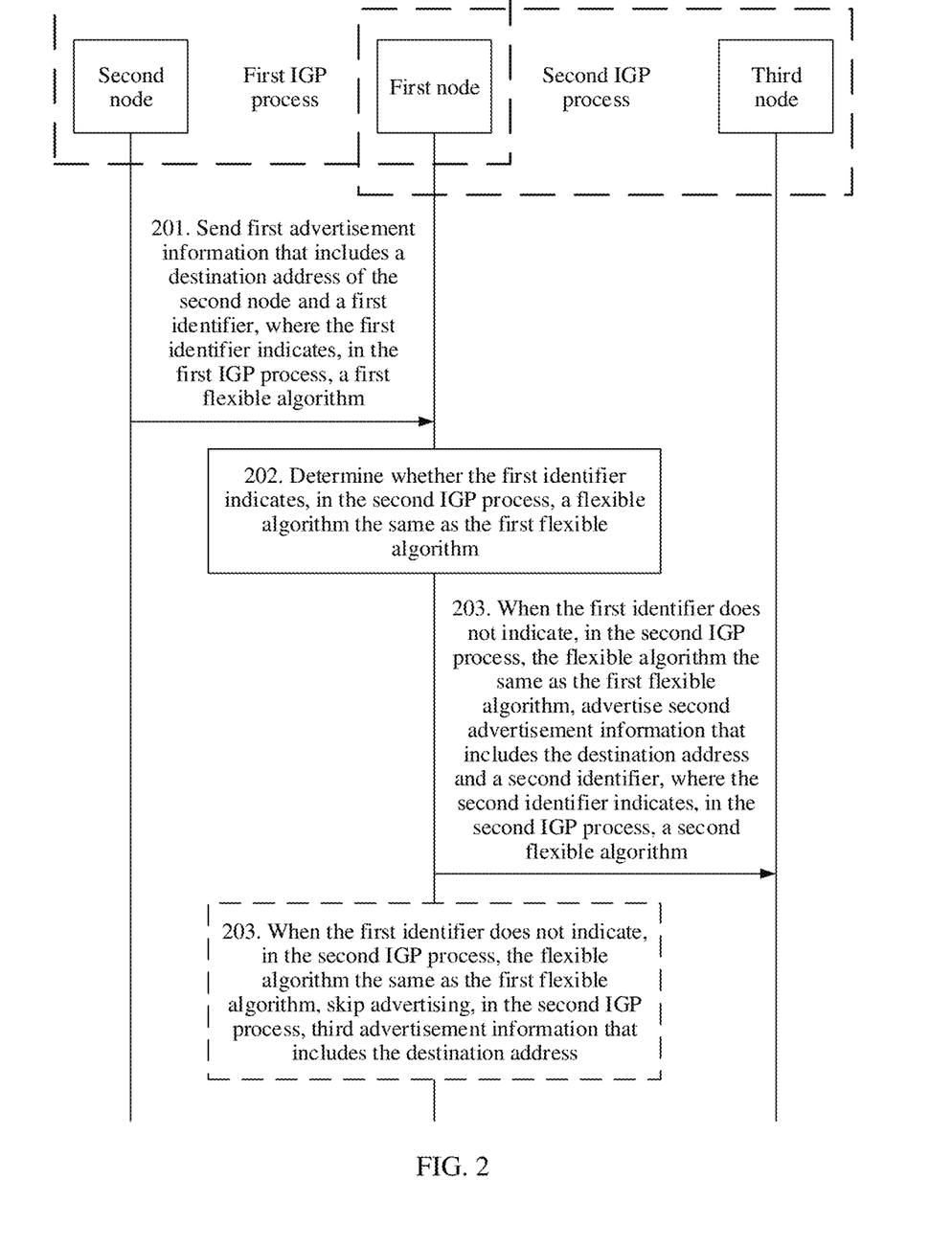
FIG. 2 is a schematic diagram of an embodiment of an advertisement information processing method according to embodiments of this application.

Based on the foregoing network 10, an embodiment of this application provides an advertisement information processing method shown in FIG. 2.

FIG. 2 is a schematic diagram of an embodiment of a communication information processing method according to embodiments of this application.

With reference to FIG. 2, the embodiment of the advertisement information processing method provided in embodiments of this application may include the following steps.

201. A first node receives, in a first IGP process, first advertisement information sent by a second node. The first advertisement information includes a destination address of the second node and a first identifier, and the first identifier indicates, in the first IGP process, a first flexible algorithm.

In this embodiment of this application, both the first node and the second node run the first IGP process. The first node is a node that simultaneously runs a plurality of IGP processes. For example, the first node may be the node 1 in FIG. 1, and the node 1 runs both the first IGP process and a second IGP process.

In the first IGP process, the second node first sends the first advertisement information to the first node based on an IGP protocol. The first advertisement information includes the destination address of the second node and the first identifier, and the first identifier indicates, in the first IGP process, the first flexible algorithm.

Optionally, in an SRv6 network, the destination address included in the first advertisement information in this embodiment of this application may refer to a locator configured by the second node. In a route advertisement phase, after configuring the locator, the second node needs to advertise locator information to another node in the first IGP process. The locator includes the first identifier of the first flexible algorithm. For example, the first identifier is 128, and the first identifier may be included in a locator TLV field. The second node advertises the locator information in a form of the locator TLV to the another node (including the first node) in the first IGP process, and the another node may compute, based on the first flexible algorithm indicated by the first identifier carried in the first advertisement information, routing information for routing to the locator.

Optionally, in an SR-MPLS network, the destination address included in the first advertisement information in this embodiment of this application may refer to a prefix-SID configured by the second node. In the route advertisement phase, after configuring the prefix-SID carrying the first identifier of the first flexible algorithm, the second node needs to advertise prefix-SID information to another node in the first IGP process. The first identifier may be included in a prefix-SID TLV field. The second node advertises the prefix-SID information in a form of the prefix-SID TLV to the another node (including the first node) in the first IGP process, and the another node may compute, based on the first flexible algorithm indicated by the first identifier carried in the first advertisement information, routing information for routing to the prefix-SID.

It should be noted that, in this embodiment of this application, in addition to the destination address of the second node and the first identifier, the first advertisement information may include other information. Whether the first advertisement information further includes the other information, specific content of the other information, and a specific form of the first advertisement information are not limited in this embodiment of this application.

202. The first node determines whether the first identifier indicates, in the second IGP process, a flexible algorithm the same as the first flexible algorithm.

In this embodiment of this application, the first node can obtain, from the first node, information about all flexible algorithms deployed in all IGP processes run by the first node. In this embodiment of this application, after receiving, in the first IGP process, the first advertisement information sent by the second node, the first node first determines whether the first identifier indicates, in the second IGP process, the flexible algorithm the same as the first flexible algorithm. Specifically, in this embodiment of this application, whether the first identifier indicates, in the second IGP process, the flexible algorithm the same as the first flexible algorithm includes the following two cases.

Case 1: The first identifier exists in a flexible algorithm deployed in the second IGP process, but the flexible algorithm that the first identifier indicates in the second IGP process is different from the first flexible algorithm that the first identifier indicates in the first IGP process. Specifically, definitions of two algorithms are different. For example, a flexible algorithm whose algorithm ID is "128" is deployed in both the first IGP process and the second IGP process. However, "128" indicates the first flexible algorithm in the first IGP process. The first flexible algorithm is specifically defined as a link cost style A, an algorithm priority B, and a link constraint C for participating in path computation during the path computation. A definition of a flexible algorithm indicated by "128" in the second IGP process is different from that of the first flexible algorithm and specifically includes the link cost style A, an algorithm priority C, and a link constraint F for participating in the path computation during the path computation.

Case 2: A flexible algorithm deployed in the second IGP process does not include the first identifier. For example, the first flexible algorithm whose algorithm ID is "128" is deployed in the first IGP process, but a flexible algorithm whose algorithm ID is "128" does not exist in the second IGP process.

In this embodiment of this application, after receiving, in the first IGP process, the first advertisement information sent by the second node, the first node determines whether the second IGP process meets the foregoing two cases. Specifically, the first node may first determine whether the first identifier exists in the second IGP process. If the first identifier does not exist in the second IGP process, the foregoing Case 2 is met. If the first identifier exists in the second IGP process, whether the flexible algorithm that the first identifier indicates in the second IGP process is the same as the first flexible algorithm is further determined. If the flexible algorithm is not the same as the first flexible algorithm, the foregoing Case 1 is met.

203. When the first identifier does not indicate, in the second IGP process, the flexible algorithm the same as the first flexible algorithm, the first node advertises, in the second IGP process, second advertisement information to a third node. The second advertisement information includes the destination address and a second identifier, the second identifier indicates, in the second IGP process, a second flexible algorithm, and the second advertisement information is used to generate first routing information for routing to the second node. Alternatively, when the first identifier does not indicate, in the second IGP process, the flexible algorithm the same as the first flexible algorithm, the first node skips advertising, in the second IGP process, third advertisement information that includes the destination address.

In this embodiment of this application, when the first node determines that the first identifier does not indicate, in the second IGP process, the flexible algorithm the same as the first flexible algorithm, that is, when the flexible algorithm deployed in the second IGP process meets Case 1 or Case 2 in step 202, the first node may choose to advertise, in the second IGP process, the second advertisement information to the third node. The second advertisement information includes the destination address of the second node and the second identifier. The second identifier indicates, in the second IGP process, the second flexible algorithm.

Specifically, in this embodiment of this application, after the first node determines that the first identifier does not indicate, in the second IGP process, the flexible algorithm the same as the first flexible algorithm, the first node may first determine the second flexible algorithm from one or more flexible algorithms deployed in the second IGP process. Then, the first node generates the second advertisement information carrying the second identifier of the second flexible algorithm, and finally advertises the second advertisement information to the third node in the second IGP process. It should be noted that, in this embodiment of this application, the second identifier is an identifier different from the first identifier. The second flexible algorithm may be an algorithm the same as the first flexible algorithm, or may be an algorithm different from the first flexible algorithm. This is not limited in this embodiment of this application. In addition, when the first identifier exists in the second IGP process, the second flexible algorithm may alternatively be the flexible algorithm that the first identifier indicates in the second IGP process. This case is not excluded in this embodiment of this application. A manner of determining the second flexible algorithm is not specifically limited in this embodiment of this application either. In this embodiment of this application, the third node may be any node in the second IGP process. The third node may generate, based on the second advertisement information advertised by the first node and by using the second flexible algorithm indicated by the second identifier carried in the second advertisement information, the first routing information for routing to the second node.

Alternatively, in this embodiment of this application, when the first node determines that the first identifier does not indicate, in the second IGP process, the flexible algorithm the same as the first flexible algorithm, that is, when the flexible algorithm deployed in the second IGP process meets Case 1 or Case 2 in step 202, the first node may choose not to advertise the third advertisement information that includes the destination address of the second node. That is, in the two cases, the first node may choose not to import the destination address of the second node in the first IGP process to the second IGP process.

In this embodiment of this application, in a process of importing advertisement information across processes, the first node may first determine whether a flexible algorithm identifier that is carried in the imported advertisement information indicates a same flexible algorithm in an IGP process to which the advertisement information is to be imported. If the identifier does not indicate the same flexible algorithm, the first node may include an identifier of a flexible algorithm supported by the IGP process to which the advertisement information is to be imported in the advertisement information for advertising, or may choose not to advertise the advertisement information in the IGP process to which the advertisement information is to be imported. In this way, a problem that the advertisement information imported across processes cannot work normally when flexible algorithms deployed in two IGP processes are different is resolved.

Figure 3:
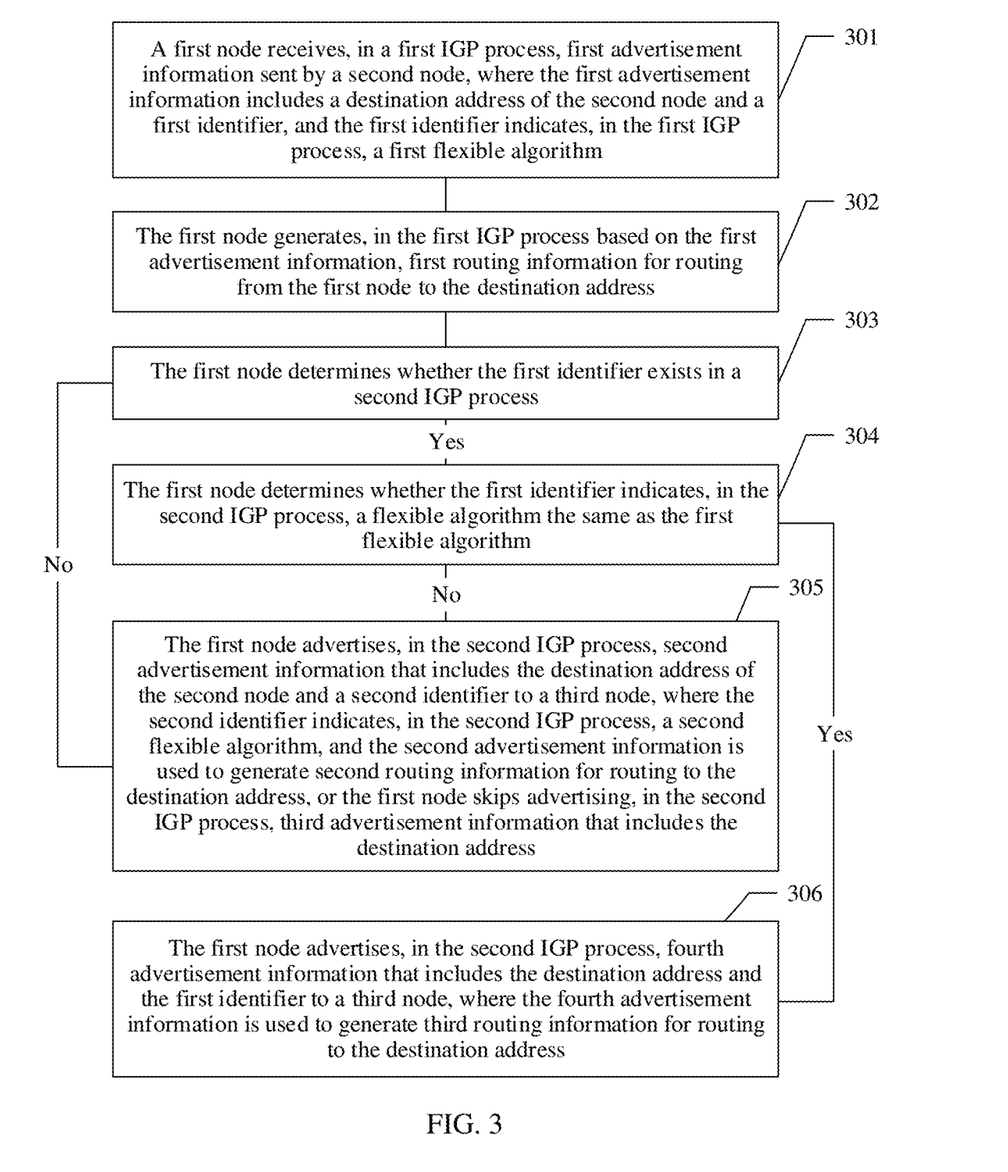
FIG. 3 is a schematic diagram of another embodiment of an advertisement information processing method according to embodiments of this application.

FIG. 3 is a schematic diagram of another embodiment of an advertisement information processing method according to embodiments of this application.

With reference to FIG. 3, the another embodiment of the advertisement information processing method provided in embodiments of this application may include the following steps.

301. A first node receives, in a first IGP process, first advertisement information sent by a second node. The first advertisement information includes a destination address of the second node and a first identifier, and the first identifier indicates, in the first IGP process, a first flexible algorithm.

For understanding of this embodiment of this application, refer to step 201 in FIG. 2. Details are not described herein again.

302. The first node generates, in the first IGP process based on the first advertisement information, first routing information for routing from the first node to the destination address.

In this embodiment of this application, after the first node receives, in the first IGP process, the first advertisement information sent by the second node, the first node computes and generates, by using the first flexible algorithm, the first routing information for routing to the destination address.

For example, in an SRv6 network, when the destination address of the second node in the first advertisement information is a locator configured by the second node, the first node computes, by using a first flexible algorithm indicated in the first IGP process by a first identifier included in a TLV field of the locator, first routing information for routing to the locator.

For example, in an SR-MPLS network, when the destination address of the second node in the first advertisement information is a prefix-SID configured by the second node, the first node computes, by using a first flexible algorithm indicated in the first IGP process by a first identifier included in a TLV field of the prefix-SID, first routing information for routing to the prefix-SID.

303. The first node determines whether the first identifier exists in a second IGP process.

In this embodiment of this application, after receiving the first advertisement information sent by the second node, the first node determines whether the first identifier exists in the second IGP process. For example, the first identifier included in the first advertisement information is an algorithm ID "128", and after receiving the first advertisement information sent by the second node, the first node determines whether a flexible algorithm whose algorithm ID is "128" exists in the second IGP process.

For understanding of this embodiment of this application, reference may also be made to related content in step 202 in FIG. 2. Details are not described herein again.

It should be noted that a sequence of step 302 and step 303 is not limited in this embodiment of this application.

304. If the first identifier exists in the second IGP process, the first node determines whether the first identifier indicates, in the second IGP process, a flexible algorithm the same as the first flexible algorithm.

In this embodiment of this application, when the first node determines that the first identifier exists in the second IGP process, the first node determines whether the first identifier indicates, in the second IGP process, the flexible algorithm the same as the first flexible algorithm.

For understanding of this embodiment of this application, refer to related content of Case 1 in step 202 in FIG. 2. Details are not described herein again.

305. If the first identifier exists in the second IGP process, but a flexible algorithm that the first identifier indicates in the second IGP process is different from the first flexible algorithm, or the first identifier does not exist in the second IGP process, the first node advertises, in the second IGP process, second advertisement information to a third node. The second advertisement information includes a destination address of the second node and a second identifier. The second identifier indicates, in the second IGP process, a second flexible algorithm, the second flexible algorithm meets a preset condition, and the second advertisement information is used to generate second routing information for routing to the destination address.

In this embodiment of this application, when the first node determines that the first identifier exists in the second IGP process, but the flexible algorithm that the first identifier indicates in the second IGP process is different from the first flexible algorithm, or when the first identifier does not exist in the second IGP process, the first node may choose to advertise, in the second IGP process, the second advertisement information to the third node. The second advertisement information includes the destination address of the second node and the second identifier. The second identifier indicates, in the second IGP process, the second flexible algorithm, and the second flexible algorithm meets the preset condition. It should be noted that the preset condition in this embodiment of this application includes one or both of the following conditions: a similarity between the second flexible algorithm and the first flexible algorithm meets a first threshold; and a priority of the second flexible algorithm meets a second threshold.

Optionally, in this embodiment of this application, that the second flexible algorithm meets the preset condition may mean that the similarity between the second flexible algorithm and the first flexible algorithm meets the first threshold. In this embodiment of this application, that the similarity between the second flexible algorithm and the first flexible algorithm meets the first threshold includes two cases: definitions of the first flexible algorithm and the second flexible algorithm are completely the same, and definitions of the first flexible algorithm and the second flexible algorithm are partially the same.

If meeting the first threshold means that the definitions of the second flexible algorithm and the first flexible algorithm are completely the same, when the first node determines that the first identifier exists in the second IGP process, but the flexible algorithm that the first identifier indicates in the second IGP process is different from the first flexible algorithm, or when the first identifier does not exist in the second IGP process, the first node may determine, based on the definition of the first flexible algorithm, from one or more flexible algorithms deployed in the second IGP process, whether the second flexible algorithm that has a definition completely the same as the definition of the first flexible algorithm exists. When it is determined that the second flexible algorithm exists, the first node generates the second advertisement information carrying the second identifier of the second flexible algorithm, and advertises the second advertisement information in the second IGP process.

If meeting the first threshold means that the definitions of a third flexible algorithm and the first flexible algorithm are partially the same, when the first node determines that the first identifier exists in the second IGP process, but the flexible algorithm that the first identifier indicates in the second IGP process is different from the first flexible algorithm, or when the first identifier does not exist in the second IGP process, the first node may determine, based on a specific rule of the similarity meeting the first threshold specified in the preset condition, whether the second flexible algorithm exists. For example, the first flexible algorithm includes specific definitions: a link cost style A, an algorithm priority B, and a link constraint C for participating in path computation during the path computation. That the similarity meets the first threshold means that a definition of a flexible algorithm meets that a link cost style is A and an algorithm priority is B during the path computation. In this case, the first node may determine whether the second flexible algorithm that meets the condition exists in the flexible algorithms deployed in the second IGP process. When it is determined that the second flexible algorithm exists, the first node generates the second advertisement information carrying the second identifier of the second flexible algorithm, and advertises the second advertisement information in the second IGP process. It should be noted that there may be another rule for the similarity meeting the first threshold. This is not limited in this embodiment of this application.

Optionally, in this embodiment of this application, that the second flexible algorithm meets the preset condition may mean that the priority of the second flexible algorithm meets the second threshold. For example, a priority sequence is set for the flexible algorithms deployed in the second IGP process. When the first node determines that the first identifier exists in the second IGP process, but the flexible algorithm that the first identifier indicates in the second IGP process is different from the first flexible algorithm, or when the first identifier does not exist in the second IGP process, the first node may alternatively select, based on the preset priority sequence, the second flexible algorithm whose priority meets the second threshold, generate the second advertisement information carrying the second identifier of the second flexible algorithm, and advertise the second advertisement information in the second IGP process.

Optionally, in this embodiment of this application, that the second flexible algorithm meets the preset condition may alternatively mean that the similarity between the second flexible algorithm and the first flexible algorithm meets the first threshold and the priority of the second flexible algorithm meets the second threshold.

It should be noted that the preset condition in this embodiment of this application may alternatively be another rule. The second flexible algorithm may have an association relationship with the first flexible algorithm, or may be irrelevant to the first flexible algorithm. This is not limited in this embodiment of this application. For example, one or more flexible algorithms are set according to a customer requirement. When the first node determines that the first identifier exists in the second IGP process, but the flexible algorithm that the first identifier indicates in the second IGP process is different from the first flexible algorithm, or when the first identifier does not exist in the second IGP process, the first node may determine the second flexible algorithm according to the customer requirement, generate the second advertisement information carrying the second identifier of the second flexible algorithm, and advertise the second advertisement information in the second IGP process.

Alternatively, in this embodiment of this application, if the first node determines that the first identifier exists in the second IGP process, but the flexible algorithm that the first identifier indicates in the second IGP process is different from the first flexible algorithm, or if the first identifier does not exist in the second IGP process, the first node may choose, in the second IGP process, not to advertise third advertisement information that includes the destination address of the second node.

For understanding of this embodiment of this application, refer to related content in step 203 in FIG. 2. Details are not described herein again.

It should be noted that, in this embodiment of this application, the second advertisement information may be generated based on the first routing information generated by the first node in step 302. After determining the second flexible algorithm that meets the preset condition, the first node generates, based on the first routing information that is for routing from the first node to the destination address and that is generated in the first IGP process, the second advertisement information carrying the second identifier of the second flexible algorithm.

306. If the first identifier exists in the second IGP process, and the first identifier indicates, in the second IGP process, the flexible algorithm the same as the first flexible algorithm, the first node advertises, in the second IGP process, fourth advertisement information to a third node. The fourth advertisement information includes the destination address of the second node and the first identifier, and the fourth advertisement information is used to generate third routing information for routing to the second node.

In this embodiment of this application, when the first node determines that the first identifier exists in the second IGP process, and the first identifier indicates, in the second IGP process, the flexible algorithm the same as the first flexible algorithm, the first node advertises, in the second IGP process, the fourth advertisement information to the third node, where the fourth advertisement information carries the destination address of the second node and the first identifier. The third node may compute, based on the first flexible algorithm, the third routing information for routing to the destination address.

It should be noted that, in this embodiment of this application, the fourth advertisement information may be generated based on the first routing information generated by the first node in step 302. After determining the first flexible algorithm that the first identifier indicates in the first IGP process and the flexible algorithm that is the same as the first flexible algorithm and that the first identifier indicates in the second IGP process, the first node generates, based on the first routing information that is for routing from the first node to the destination address and that is generated in the first IGP process, the second advertisement information carrying the first identifier.

In this embodiment of this application, in a process of importing advertisement information across processes, the first node may first determine whether a flexible algorithm identifier that is carried in the imported advertisement information indicates a same flexible algorithm in an IGP process to which the advertisement information is to be imported. If the flexible algorithm identifier indicates the same flexible algorithm, the advertisement information may be directly imported and advertised. If the flexible algorithm identifier does not indicate the same flexible algorithm, the first node may include an identifier of a flexible algorithm supported by the IGP process to which the advertisement information is to be imported in the advertisement information for advertising, or may choose not to advertise the advertisement information in the IGP process to which the advertisement information is to be imported. In this way, a problem that the advertisement information imported across processes cannot work normally when flexible algorithms deployed in two IGP processes are different is resolved.

Figure 4:
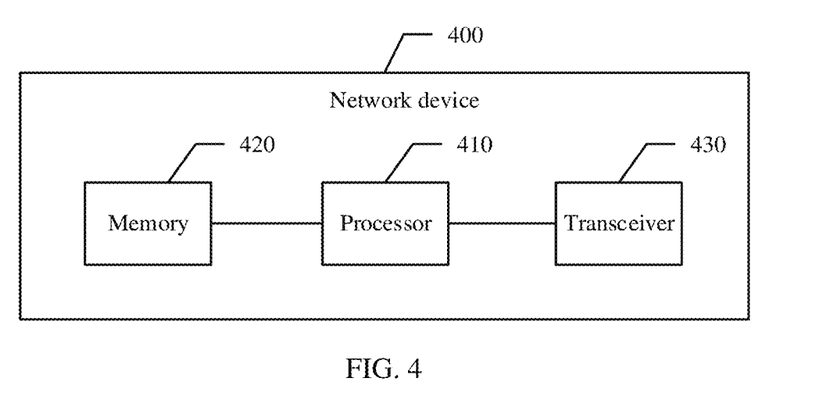
FIG. 4 is a schematic diagram of a structure of a network device according to an embodiment of this application.

The foregoing specifically describes the advertisement information processing method provided in embodiments of this application. The following describes an advertisement information processing apparatus provided in an embodiment of this application. Refer to FIG. 4.

It may be understood that to implement the foregoing functions, the foregoing first node includes corresponding hardware structures and/or software modules for performing various functions. A person skilled in the art should easily be aware that, in combination with the example modules and algorithm steps described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In terms of a hardware structure, the first node may be implemented by a physical device or jointly implemented by a plurality of physical devices, or the first node may be a logical function module inside a physical device. This is not specifically limited in this embodiment of this application.

For example, the first node in FIG. 2 and FIG. 3 may be implemented by using a network device 400 in FIG. 4. The network device 400 may be the first node in a network. The first node runs a first interior gateway protocol IGP process and a second IGP process. The network further includes a second node and a third node, the second node runs the first IGP process, and the third node runs the second IGP process. The network device 400 includes a processor 410, a memory 420, and a transceiver 430. The transceiver 430 is configured to communicate with another device or a communication network.

The processor 410 may be a general-purpose central processing unit (CPU), a microprocessor, an application-specific integrated circuit (ASIC), or one or more integrated circuits configured to control program execution of the solutions of this application.

The memory 420 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed to a computer. However, the memory 420 is not limited thereto. The memory 420 may exist independently, and is connected to the processor 410. The memory 420 may alternatively be integrated with the processor 410.

The memory 420 is configured to store computer-executable instructions for executing the solutions of this application, and the processor 410 controls the execution. The processor 410 is configured to execute the computer-executable instruction stored in the memory 420, to implement the advertisement information processing method provided in embodiments of this application.

Specifically, when the network device 400 is the first node in FIG. 2 and FIG. 3, the processor 410 is specifically configured to receive first advertisement information sent by the second node, where the first advertisement information includes a destination address of the second node and a first identifier, and the first identifier indicates, in the first IGP process, a first flexible algorithm; determine whether the first identifier indicates, in the second IGP process, a flexible algorithm the same as the first flexible algorithm; and when the first identifier does not indicate, in the second IGP process, the flexible algorithm the same as the first flexible algorithm: advertise, in the second IGP process, second advertisement information to the third node, where the second advertisement information includes the destination address and a second identifier, the second identifier indicates, in the second IGP process, a second flexible algorithm, and the second advertisement information is used to generate first routing information for routing to the destination address, or skip advertising third advertisement information in the second IGP process, where the third advertisement information includes the destination address. For a specific implementation, refer to detailed descriptions of step 201 to step 203 in the embodiment shown in FIG. 2 and detailed descriptions of step 301 to step 306 in the embodiment shown in FIG. 3. Details are not described herein again.

Optionally, the computer-executable instructions in this embodiment of this application may also be referred to as application program code. This is not specifically limited in this embodiment of this application.

In this embodiment of this application, functional modules of the network device may be obtained through division according to the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in this embodiment of this application, division into the modules is an example, and is merely division into logical functions. In actual implementation, another division manner may be used.

Figure 5:
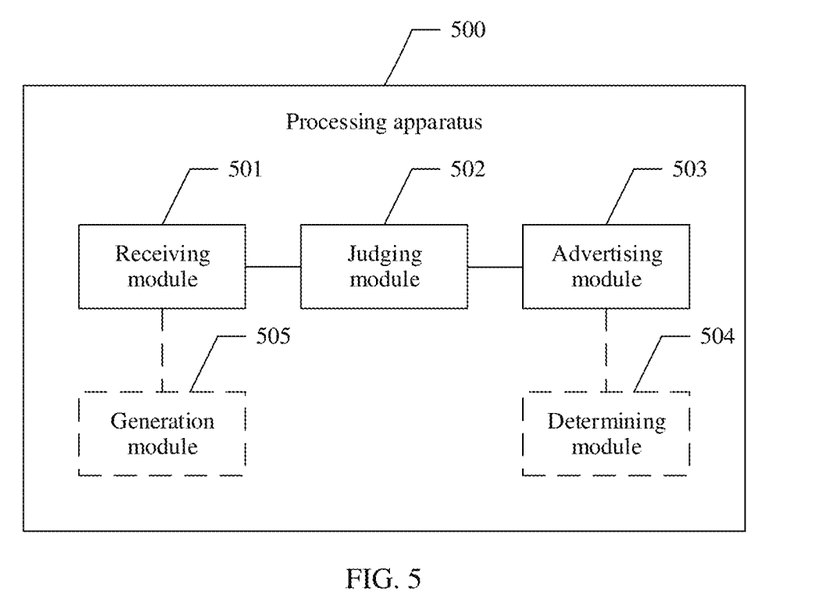
FIG. 5 is a schematic diagram of a structure of an advertisement information processing apparatus according to an embodiment of this application.

For example, when functional modules are divided in an integrated manner, FIG. 5 is a schematic diagram of a structure of an advertisement information processing apparatus 500. The processing apparatus 500 corresponds to the first node in embodiments of FIG. 2 and FIG. 3.

With reference to FIG. 5, the advertisement information processing apparatus 500 provided in an embodiment of this application may include a receiving module 501, a judging module 502, and an advertising module 503.

The receiving module 501 is configured to receive first advertisement information sent by a second node, where the first advertisement information includes a destination address of the second node and a first identifier, and the first identifier indicates, in a first IGP process, a first flexible algorithm. For a specific implementation, refer to detailed descriptions of step 201 in the embodiment shown in FIG. 2 and detailed descriptions of step 301 in the embodiment shown in FIG. 3. Details are not described herein again.

The judging module 502 is configured to determine whether the first identifier in the first advertisement information received by the receiving module 501 indicates, in a second IGP process, a flexible algorithm the same as the first flexible algorithm. For a specific implementation, refer to detailed descriptions of step 202 in the embodiment shown in FIG. 2 and detailed descriptions of step 303 and step 304 in the embodiment shown in FIG. 3. Details are not described herein again.

The advertising module 503 is configured to, when the judging module 502 determines that the first identifier does not indicate, in the second IGP process, the flexible algorithm the same as the first flexible algorithm, advertise, in the second IGP process, second advertisement information to a third node, where the second advertisement information includes the destination address of the second node and a second identifier, the second identifier indicates, in the second IGP process, a second flexible algorithm, and the second advertisement information is used to generate first routing information for routing to the destination address; or skip advertising, in the second IGP process, third advertisement information that includes the destination address. For a specific implementation, refer to detailed descriptions of step 203 in the embodiment shown in FIG. 2 and detailed descriptions of step 305 in the embodiment shown in FIG. 3. Details are not described herein again.

In this embodiment of this application, in a process of importing advertisement information across processes, the first node may first determine whether a flexible algorithm identifier that is carried in the imported advertisement information indicates a same flexible algorithm in an IGP process to which the advertisement information is to be imported. If not, the first node may include an identifier of a flexible algorithm supported by the IGP process to which the advertisement information is to be imported in the advertisement information for advertising, or may choose not to advertise the advertisement information in the IGP process to which the advertisement information is to be imported. In this way, a problem that the advertisement information imported across processes cannot work normally when flexible algorithms deployed in two IGP processes are different is resolved.

Optionally, in an embodiment, that the first identifier does not indicate, in the second IGP process, the flexible algorithm the same as the first flexible algorithm includes the first identifier exists in the second IGP process, where a third flexible algorithm that the first identifier indicates in the second IGP process is different from the first flexible algorithm; or the first identifier does not exist in the second IGP process. For a specific implementation, refer to detailed descriptions of step 202 in the embodiment shown in FIG. 2 and detailed descriptions of step 303 and step 304 in the embodiment shown in FIG. 3. Details are not described herein again.

Optionally, in an embodiment, the processing apparatus 500 further includes a determining module 504. The determining module 504 is configured to, before the advertising module 503 advertises, in the second IGP process, the second advertisement information to the third node, determine the second flexible algorithm based on the first flexible algorithm, where the second flexible algorithm meets a preset condition. For a specific implementation, refer to detailed descriptions of step 305 in the embodiment shown in FIG. 3. Details are not described herein again.

Optionally, in an embodiment, the preset condition includes one or both of the following: a similarity between the second flexible algorithm and the first flexible algorithm meets a first threshold; and a priority of the second flexible algorithm meets a second threshold. For a specific implementation, refer to detailed descriptions of step 305 in the embodiment shown in FIG. 3. Details are not described herein again.

Optionally, in an embodiment, the processing apparatus 500 further includes a generation module 505. The generation module 505 is configured to, after the receiving module 501 receives the first advertisement information sent by the second node, generate, in the first IGP process based on the first advertisement information, second routing information for routing to the destination address; and generate, in the second IGP process, the second advertisement information based on the second routing information. For a specific implementation, refer to detailed descriptions of step 302 and step 305 in the embodiment shown in FIG. 3. Details are not described herein again.

Optionally, in an embodiment, the advertising module 503 is further configured to, when the judging module 502 determines that the first identifier indicates, in the second IGP process, the flexible algorithm the same as the first flexible algorithm, advertise, in the second IGP process, fourth advertisement information to the third node, where the fourth advertisement information includes the destination address and the first identifier, and the fourth advertisement information is used to generate third routing information for routing to the destination address. For a specific implementation, refer to detailed descriptions of step 306 in the embodiment shown in FIG. 3. Details are not described herein again.

Optionally, in an embodiment, the generation module 505 is further configured to, after the receiving module 501 receives the first advertisement information sent by the second node, generate, in the first IGP process based on the first advertisement information, fourth routing information for routing to the destination address; and generate, in the second IGP process, the fourth advertisement information based on the fourth routing information. For a specific implementation, refer to detailed descriptions of step 302 and step 306 in the embodiment shown in FIG. 3. Details are not described herein again.

Optionally, in an embodiment, when the processing apparatus 500 is used in a segment routing over IPv6 data plane SRv6 network, the first identifier is included in a location information locator type-length-value TLV field. For a specific implementation, refer to detailed descriptions of step 201 in the embodiment shown in FIG. 2 and detailed descriptions of step 301 in the embodiment shown in FIG. 3. Details are not described herein again.

Optionally, in an embodiment, when the processing apparatus 500 is used in a multi-protocol label switching MPLS network, the first identifier is included in a prefix segment identifier prefix-SID type-length-value TLV field. For a specific implementation, refer to detailed descriptions of step 201 in the embodiment shown in FIG. 2 and detailed descriptions of step 301 in the embodiment shown in FIG. 3. Details are not described herein again.

It should be understood that the judging module 502, the determining module 504, and the generation module 505 in the foregoing embodiment may be implemented by a processor or a processor-related circuit component, and the receiving module 501 and the advertising module 503 in the foregoing embodiment may be implemented by a transceiver or a transceiver-related circuit component.

In addition, the judging module 502, the determining module 504, and the generation module 505 may be software function units, that is, kinetic energy steps of these units described above are implemented by using software. In this case, these software units may be software code stored in the memory 420 in the embodiment shown in FIG. 4. When reading the software code from the memory 420, the processor 410 implements a function of the processor in the embodiment shown in FIG. 4. For details, refer to detailed descriptions of the processor 410 in FIG. 4. Details are not described herein again.

Optionally, an embodiment of this application provides a chip system. The chip system includes a processor, configured to support a terminal device in implementing the foregoing data processing method. In a possible design, the chip system further includes a memory. The memory is configured to store program instructions and data that are necessary for the terminal device. The chip system may include a chip, or may include a chip and another discrete device. This is not specifically limited in this embodiment of this application. For a specific implementation process, refer to detailed descriptions of step 201 to step 203 in the embodiment shown in FIG. 2 and detailed descriptions of step 301 to step 306 in the embodiment shown in FIG. 3. Details are not described herein again.

It should be understood that the processor mentioned in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be noted that when the processor is the general-purpose processor, the DSP, the ASIC, the FPGA or the another programmable logic device, the discrete gate or transistor logic device, or the discrete hardware component, the memory (a storage module) is integrated into the processor.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example, and not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that the memory described in this specification aims to include but is not limited to these memories and any memory of another appropriate type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

All or part of the foregoing embodiments may be implemented by software, hardware, firmware, or any combination thereof. When software is used to implement the apparatus, all or a part of the apparatus may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in another manner. For example, the described apparatus embodiment is merely an example. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing describes in detail the advertisement information processing method and apparatus, and the storage medium that are provided in embodiments of this application. Principles and implementations of this application are described in this specification by using specific examples. The descriptions of the foregoing embodiments are merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to this application.

What is claimed is:

1. An advertisement information processing method comprising:
   receiving, by a first node, first advertisement information sent by a second node, wherein the first node is a node in a network, the first node runs a first interior gateway protocol (IGP) process and a second IGP process, the network further comprises the second node and a third node, the second node runs the first IGP process, the third node runs the second IGP process, the first advertisement information comprises a destination address of the second node and a first identifier, and the first identifier indicates, in the first IGP process, a first flexible algorithm;
   determining, by the first node, whether the first identifier indicates, in the second IGP process, a flexible algorithm that is the same as the first flexible algorithm; and
   performing, based on determining the first identifier does not indicate, in the second IGP process, the flexible algorithm that is the same as the first flexible algorithm:
      advertising, by the first node in the second IGP process, second advertisement information to the third node, wherein the second advertisement information comprises the destination address and a second identifier, the second identifier indicates, in the second IGP process, a second flexible algorithm, and the second advertisement information is used to generate first routing information for routing to the destination address; or
      skipping, by the first node, advertising third advertisement information in the second IGP process, wherein the third advertisement information comprises the destination address.

2. The method according to claim 1, wherein determining the first identifier does not indicate, in the second IGP process, the flexible algorithm that is the same as the first flexible algorithm comprises determining:
   the first identifier existing in the second IGP process, wherein a third flexible algorithm that the first identifier indicates in the second IGP process is different from the first flexible algorithm; or
   the first identifier does not exist in the second IGP process.

3. The method according to claim 1, wherein the method further comprises, before the advertising, by the first node in the second IGP process, second advertisement information to the third node:
   determining, by the first node, the second flexible algorithm based on the first flexible algorithm, wherein the second flexible algorithm meets a preset condition.

4. The method according to claim 3, wherein the preset condition comprises one or both of the following:
   a similarity between the second flexible algorithm and the first flexible algorithm meets a first threshold; or
   a priority of the second flexible algorithm meets a second threshold.

5. The method according to claim 1, wherein the method further comprises, after the receiving, by the first node, first advertisement information sent by the second node:
   generating, by the first node in the first IGP process based on the first advertisement information, second routing information for routing to the destination address; and
   generating, by the first node in the second IGP process, the second advertisement information based on the second routing information.

6. The method according to claim 1, wherein the method further comprises performing, based on the first identifier indicating, in the second IGP process, the flexible algorithm that is the same as the first flexible algorithm:
   advertising, by the first node in the second IGP process, fourth advertisement information to the third node, wherein the fourth advertisement information comprises the destination address and the first identifier, and the fourth advertisement information is used to generate third routing information for routing to the destination address.

7. The method according to claim 6, wherein the method further comprises, after the receiving, by the first node, first advertisement information sent by the second node:
   generating, by the first node in the first IGP process based on the first advertisement information, fourth routing information for routing to the destination address; and generating, by the first node in the second IGP process, the fourth advertisement information based on the fourth routing information.

8. The method according to claim 1, wherein, based on the method being applied to a segment routing over internet protocol version 6 IPV6 data plane (SRv6) network, the first identifier is comprised in a location information locator type-length-value (TLV) field.

9. The method according to claim 1, wherein, based on the method being applied to a multi-protocol label switching (MPLS) network, the first identifier is comprised in a prefix segment identifier prefix-(SID) type-length-value (TLV) field.

10. An advertisement information processing apparatus comprising:
a receiver, configured to receive first advertisement information sent by a second node, wherein the processing apparatus is a first node in a network, the first node runs a first interior gateway protocol (IGP) process and a second IGP process, the network further comprises the second node and a third node, the second node runs the first IGP process, the third node runs the second IGP process, the first advertisement information comprises a destination address of the second node and a first identifier, and the first identifier indicates, in the first IGP process, a first flexible algorithm;
at least one processor; and
at least one memory storing instructions that are executable by the at least one processor, execution of the instructions causing the processing apparatus to:
determine whether the first identifier in the first advertisement information indicates, in the second IGP process, a flexible algorithm that is the same as the first flexible algorithm; and
perform, based on determining that the first identifier does not indicate, in the second IGP process, the flexible algorithm that is the same as the first flexible algorithm:
advertise, in the second IGP process, second advertisement information to the third node, wherein the second advertisement information comprises the destination address and a second identifier, the second identifier indicates, in the second IGP process, a second flexible algorithm, and the second advertisement information is used to generate first routing information for routing to the destination address; or
skip advertising third advertisement information in the second IGP process, wherein the third advertisement information comprises the destination address.

11. The processing apparatus according to claim 10, wherein determining the first identifier does not indicate, in the second IGP process, the flexible algorithm that is the same as the first flexible algorithm comprises determining:
the first identifier exists in the second IGP process, wherein a third flexible algorithm that the first identifier indicates in the second IGP process is different from the first flexible algorithm; or
the first identifier does not exist in the second IGP process.

12. The processing apparatus according to claim 10, wherein execution of the instructions further causes the processing apparatus to:
before advertising, in the second IGP process, the second advertisement information to the third node, determine the second flexible algorithm based on the first flexible algorithm, wherein the second flexible algorithm meets a preset condition.

13. The processing apparatus according to claim 12, wherein the preset condition comprises one or both of the following:
a similarity between the second flexible algorithm and the first flexible algorithm meets a first threshold; or
a priority of the second flexible algorithm meets a second threshold.

14. The processing apparatus according to claim 10, wherein execution of the instructions further causes the processing apparatus to:
after receiving the first advertisement information sent by the second node, generate, in the first IGP process based on the first advertisement information, second routing information for routing to the destination address; and generate, in the second IGP process, the second advertisement information based on the second routing information.

15. The processing apparatus according to claim 14, wherein execution of the instructions further causes the processing apparatus to:
generate, after receiving the first advertisement information sent by the second node, generate, in the first IGP process based on the first advertisement information, fourth routing information for routing to the destination address; and
generate, in the second IGP process, fourth advertisement information based on the fourth routing information.

16. The processing apparatus according to claim 10, wherein execution of the instructions further causes the processing apparatus to:
based on determining that the first identifier indicates, in the second IGP process, the flexible algorithm that is the same as the first flexible algorithm, advertise, in the second IGP process, fourth advertisement information to the third node, wherein the fourth advertisement information comprises the destination address and the first identifier, and the fourth advertisement information is used to generate third routing information for routing to the destination address.

17. The processing apparatus according to claim 10, wherein, based on the processing apparatus being located in a segment routing over IPv6 data plane (SRv6) network, and the first identifier is comprised in a location information locator type-length-value (TLV) field.

18. The processing apparatus according to claim 10, wherein, based on the processing apparatus being located in a multi-protocol label switching (MPLS) network, the first identifier is comprised in a prefix segment identifier prefix-(SID) type-length-value (TLV) field.

19. A non-transitory computer-readable storage medium storing a program to be executed by a processor, the program including instructions for:
receiving, by a first node, first advertisement information sent by a second node, wherein the first node is a node in a network, the first node runs a first interior gateway protocol (IGP) process and a second IGP process, the network further comprises the second node and a third node, the second node runs the first IGP process, the third node runs the second IGP process, the first advertisement information comprises a destination address of the second node and a first identifier, and the first identifier indicates, in the first IGP process, a first flexible algorithm;

determining, by the first node, whether the first identifier indicates, in the second IGP process, a flexible algorithm that is the same as the first flexible algorithm; and performing, based on determining the first identifier not indicating, in the second IGP process, the flexible algorithm that is the same as the first flexible algorithm:

advertising, by the first node in the second IGP process, second advertisement information to the third node, wherein the second advertisement information comprises the destination address and a second identifier, the second identifier indicates, in the second IGP process, a second flexible algorithm, and the second advertisement information is used to generate first routing information for routing to the destination address; or skipping, by the first node, advertising third advertisement information in the second IGP process, wherein the third advertisement information comprises the destination address.

20. The non-transitory computer-readable storage medium according to claim 19, wherein determining the first identifier does not indicate, in the second IGP process, the flexible algorithm that is the same as the first flexible algorithm comprises determining:

the first identifier existing in the second IGP process, wherein a third flexible algorithm that the first identifier indicates in the second IGP process is different from the first flexible algorithm; or the first identifier does not exist in the second IGP process.

* * * * *